(12) United States Patent
Yong et al.

(10) Patent No.: US 11,317,405 B2
(45) Date of Patent: *Apr. 26, 2022

(54) NEIGHBOR AWARENESS NETWORKING RANGING

(71) Applicant: Apple Inc., Cupertino, CA (US)

(72) Inventors: Su Khiong Yong, Palo Alto, CA (US); Christiaan A. Hartman, San Jose, CA (US); Yong Liu, Campbell, CA (US); Lawrie Kurian, San Jose, CA (US); Peter N. Heerboth, San Jose, CA (US); Guoqing Li, Cupertino, CA (US); Daniel R. Borges, San Francisco, CA (US); Chiu Ngok E. Wong, San Jose, CA (US); Saravanan Balasubramaniyan, Los Gatos, CA (US); Tashbeeb Haque, San Francisco, CA (US); Anand Rajagopalan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/433,198

(22) Filed: Jun. 6, 2019

(65) Prior Publication Data

US 2019/0289603 A1    Sep. 19, 2019

Related U.S. Application Data

(63) Continuation of application No. 15/131,911, filed on Apr. 18, 2016, now Pat. No. 10,342,013.

(Continued)

(51) Int. Cl.
*H04W 72/04* (2009.01)
*H04W 72/12* (2009.01)
(Continued)

(52) U.S. Cl.
CPC .............. *H04W 72/0446* (2013.01); *H04W 72/1278* (2013.01); *H04W 76/14* (2018.02); *H04W 8/005* (2013.01); *H04W 84/12* (2013.01)

(58) Field of Classification Search
CPC ......... H04W 72/0446; H04W 72/1278; H04W 76/14; H04W 84/12; H04W 8/005
See application file for complete search history.

(56) References Cited

U.S. PATENT DOCUMENTS 9,763,073 B2 *  9/2017  Segev ................... H04W 8/005
9,819,750 B2   11/2017  Raissinia
(Continued)

FOREIGN PATENT DOCUMENTS

WO   2011/039719 A1   4/2011
WO   2015041708 A1    3/2015

OTHER PUBLICATIONS

First Office Action, Chinese Application for Invention No. 201610245548.1, dated Feb. 22, 2019, six pages.

(Continued)

*Primary Examiner* — Asad M Nawaz
*Assistant Examiner* — Berhanu D Belete
(74) *Attorney, Agent, or Firm* — Kowert, Hood, Munyon, Rankin & Goetzel, P.C.

(57) ABSTRACT

One or more wireless stations may operate to configure Neighbor Awareness Networking (NAN)—direct communication with neighboring wireless stations, e.g., without utilizing an intermediate access point. Scheduling of NAN ranging procedures may include a first wireless station sending first information, including first scheduling preferences and a first ranging role, to a second wireless station. The first wireless station receives second information, including second scheduling preferences and a second rang- (Continued)

ing role, from the second wireless station. The first wireless station may initiate the ranging procedure based on the scheduling preferences and ranging parameters. Alternatively, the second wireless station and may initiate the ranging procedure based on the scheduling preferences and ranging parameters.

20 Claims, 11 Drawing Sheets

Related U.S. Application Data

(60) Provisional application No. 62/149,801, filed on Apr. 20, 2015.

(51) Int. Cl.
   *H04W 76/14* (2018.01)
   *H04W 84/12* (2009.01)
   *H04W 8/00* (2009.01)

(56) References Cited

U.S. PATENT DOCUMENTS

| | | |
|---|---|---|
| 2008/0304361 A1 | 12/2008 | Peng et al. |
| 2010/0067476 A1 | 3/2010 | Periyalwar |
| 2010/0322213 A1 | 12/2010 | Liu |
| 2012/0284328 A1 | 11/2012 | Chung |
| 2014/0254575 A1 | 9/2014 | Venkatraman et al. |
| 2014/0269555 A1 | 9/2014 | Sadasivam |
| 2014/0269658 A1* | 9/2014 | Sadasivam ............... H04W 4/80 370/338 |
| 2014/0293851 A1* | 10/2014 | Abraham ........... H04W 56/0015 370/311 |
| 2014/0335885 A1 | 11/2014 | Steiner et al. |
| 2015/0036540 A1 | 2/2015 | Kasslin |
| 2015/0081840 A1 | 3/2015 | Patil |
| 2015/0098388 A1 | 4/2015 | Fang |
| 2015/0319235 A1 | 11/2015 | Liu |
| 2015/0319675 A1 | 11/2015 | Park |
| 2015/0350027 A1* | 12/2015 | Raissinia ........... H04W 56/0015 455/517 |
| 2015/0365835 A1* | 12/2015 | Segev .................... H04W 8/005 370/252 |
| 2016/0014565 A1 | 1/2016 | Segev |
| 2016/0127459 A1 | 5/2016 | Qi |
| 2016/0150537 A1 | 5/2016 | Jung |
| 2016/0174139 A1* | 6/2016 | Segev .................... H04W 8/005 455/434 |
| 2016/0183171 A1 | 6/2016 | Hareuveni |
| 2016/0242056 A1 | 8/2016 | Patil |
| 2016/0337836 A1 | 11/2016 | Kim |
| 2018/0054698 A1* | 2/2018 | Park .......................... H04W 4/02 |
| 2018/0103362 A1* | 4/2018 | Segev .................... H04W 8/005 |
| 2019/0387389 A1* | 12/2019 | Segev .................... H04W 8/005 |

OTHER PUBLICATIONS

Wifi.org, "Discover Wi-Fi, Wi-Fi Aware", webpage, Feb. 2, 2016, 6 pages, [http://www.wi-fi.org/discover-wi-fi/wi-fi-aware].
Camps-Mur, "Enabling always on service discovery: Wifi neighbor awareness networking", Apr. 29, 2015, 8 pages, vol. 22, Issue 2, Wireless Communications, IEEE.

\* cited by examiner

NEIGHBOR AWARENESS NETWORKING RANGING

PRIORITY DATA

This application is a continuation of U.S. patent application Ser. No. 15/131,911, titled "Neighbor Awareness Networking Ranging", filed Apr. 18, 2016 by Su Khiong Yong, Christiaan A Hartman, Yong Liu, Lawrie Kurian, Peter N Heerboth, Guoqing Li, Daniel R Borges, Chiu Ngok E Wong, Saravanan Balasubramaniyan, Tashbeeb Haque, and Anand Rajagopalan, which claims benefit of priority to U.S. Provisional Application Ser. No. 62/149,801, titled "Neighbor Awareness Networking Ranging", filed Apr. 20, 2015 by Su Khiong Yong, Christiaan A Hartman, Yong Liu, Lawrie Kurian, Peter N Heerboth, Guoqing Li, Daniel R Borges, Chiu Ngok E Wong, Saravanan Balasubramaniyan, Tashbeeb Haque, and Anand Rajagopalan, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

SUMMARY

Embodiments described herein relate to ranging between peer devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure Neighbor Awareness Networking (NAN)—direct communication with neighboring wireless stations, e.g., without utilizing an intermediate access point. Configuration of NAN includes setup, scheduling, and performance of a NAN ranging procedure. Scheduling of a NAN ranging procedure includes a first wireless device sending first information that includes first scheduling preferences and a first ranging role of the first wireless device to a second wireless device. The first wireless device then receives second information that includes second scheduling preferences and a second ranging role of the second wireless device. The first information may also include first ranging parameters associated with the first wireless device and the first wireless device may initiate the ranging procedure based on the scheduling preferences and ranging parameters. Alternatively, the second information may also include second ranging parameters associated with the second wireless device and the second wireless device may initiate the ranging procedure based on the scheduling preferences and ranging parameters.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
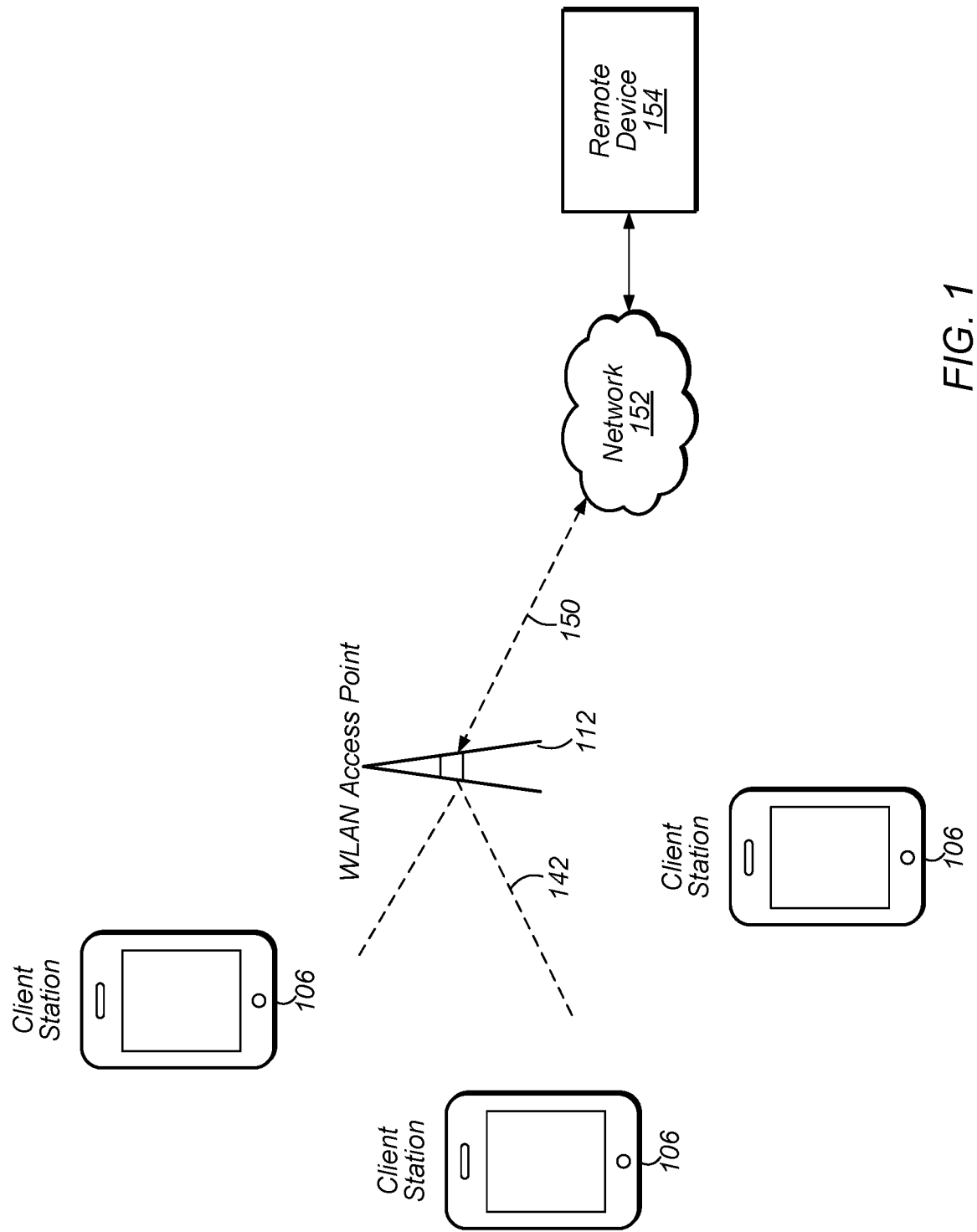
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
NAN: neighbor awareness networking
LPN: low power NAN device
NSDP: NAN service discovery proxy
TTL: time to live

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Low Power NAN device (LPN)—refers to a NAN device (e.g., a wireless device) that may have limited power and may typically operate in a hibernate (or sleep) mode.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments.

As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 may be configured to schedule a NAN ranging procedure, including sending information that includes scheduling preferences and a ranging role to another wireless device (e.g., another wireless device 106 and/or access point 112). Wireless device 106 may then receive information that includes scheduling preferences and a ranging role of the other wireless device. The information exchanged between the wireless devices may include ranging parameters. Wireless device 106 may initiate the ranging procedure based on the exchanged scheduling preferences and ranging parameters.

Figure 2:
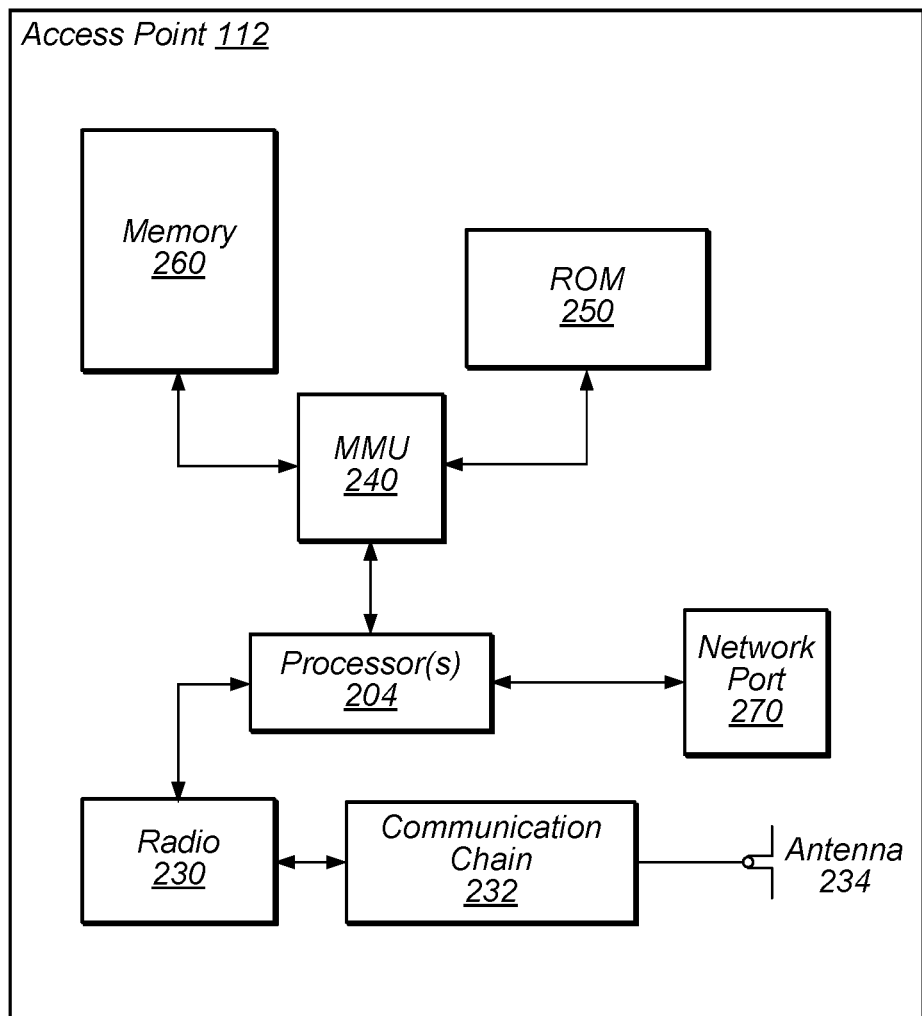
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to schedule a NAN ranging procedure, including sending information that includes scheduling preferences and a ranging role to a wireless device (e.g., wireless device 106). AP 112 may then receive information that includes scheduling preferences and a ranging role of the wireless device. The information exchanged between the AP and wireless device may include ranging parameters. AP 112 may initiate the ranging procedure based on the exchanged scheduling preferences and ranging parameters.

Figure 3:
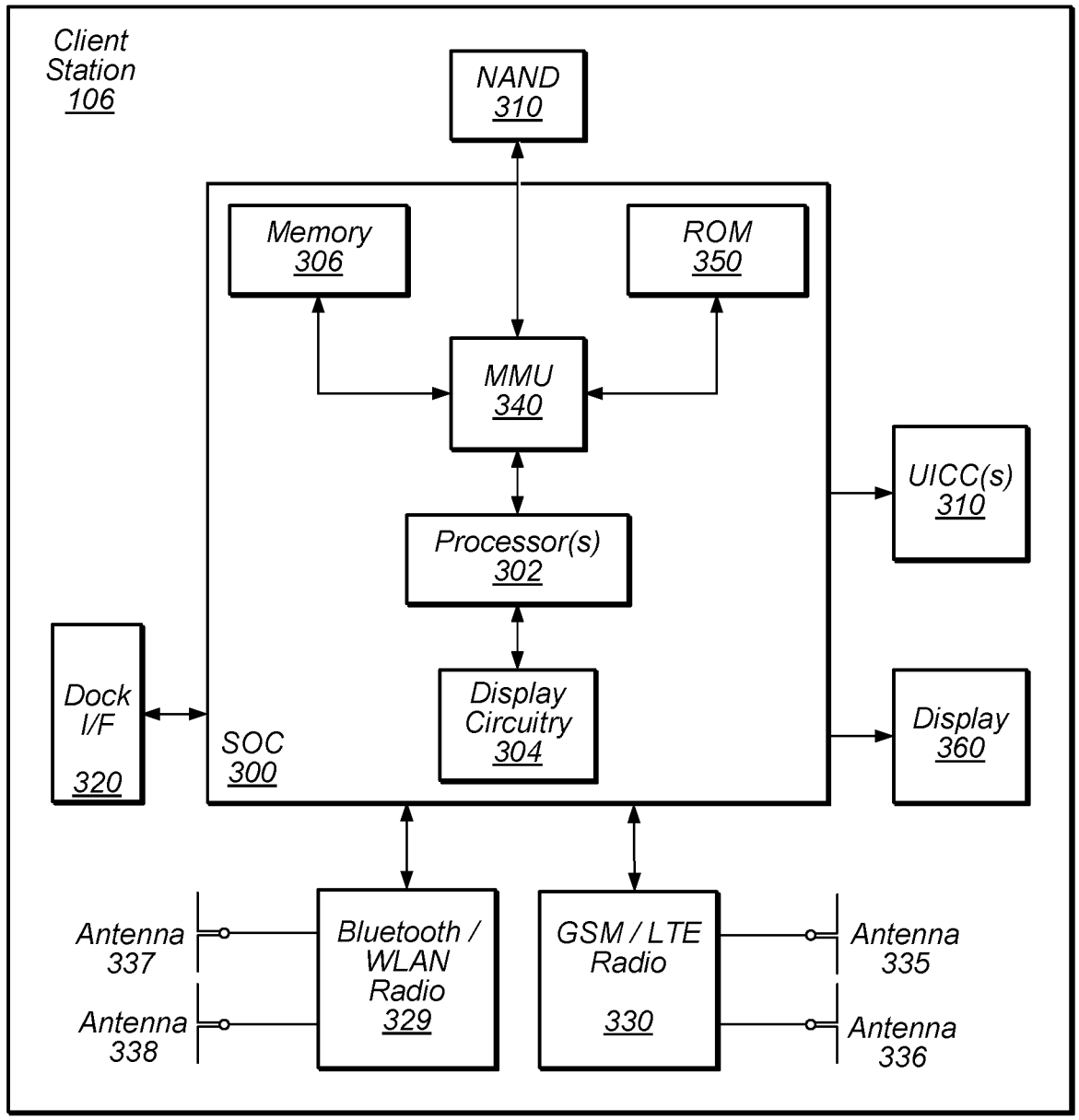
FIG. 3 illustrates an example simplified block diagram of a wireless station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to schedule a NAN ranging procedure, including sending information that includes scheduling preferences and a ranging role to another wireless device (e.g., another wireless device 106 and/or access point 112). Client station 106 may then receive information that includes scheduling preferences and a ranging role of the other wireless device. The information exchanged between the wireless devices may include ranging parameters. Client station 106 may initiate the ranging procedure based on the exchanged scheduling preferences and ranging parameters.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station with which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability.

The NAN protocol includes two aspects: 1) synchronization and discovery (NAN 1.0) and 2) datapath transmission (NAN 2.0). NAN 1.0 describes methods for NAN protocol synchronization and discovery. One feature described in NAN 2.0 is ranging. In NAN 2.0, two NAN devices may determine a distance between them by leveraging the fine timing measurement (FTM) protocol specified in IEEE 802.11mc. Note that although FTM is primarily intended to support access point to station measurements (AP-STA mode), it may also be used for peer-to-peer measurements (P2P mode). However, the FTM protocol may not scale well in scenarios where there are many STAs attempting to perform ranging (e.g. in a stadium or other large venue). Additionally, the existing FTM protocol cannot be used "as-is" in the NAN framework. For example, FTM protocol has its own scheduling distinct from NAN scheduling. Embodiments described herein provide systems and methods for a NAN ranging protocol. The NAN ranging protocol includes NAN ranging capability discovery (RCD), NAN ranging setup (including ranging role, scheduling, and measurements), and NAN ranging termination.

NAN Ranging Capability Discovery

In some embodiments, a NAN device may support, or be capable of performing, ranging. In other words, a NAN device may support ranging capability. In such embodiments, a ranging capable NAN device ("NR-DEV") may indicate its ranging capability in at least one of a NAN synchronization beacon, a NAN discovery beacon, and/or service discovery frames (SDFs). Note that a ranging capability indication (e.g., as included in one or more SDFs, NAN synchronization beacons, NAN discovery beacons, and/or other messaging) may be provided by including a bit to indicate if the device is ranging capable, identifying a sub-set of ranging capabilities as defined in the FTM protocol, or identifying a full set of ranging capabilities as defined in the FTM protocol. Additionally, in some embodiments, a NR-DEV may only negotiate and/or initiate ranging with peer NR-DEVs with a compatible role. Table 1 shows possible ranging roles of a NR-DEV acting as a subscriber/publisher according to some embodiments. It should be noted that the possible ranging roles shown in Table 1 are exemplary only and other combinations of roles are envisioned.

TABLE 1

NR-DEV Ranging Roles

| | | | Subscriber | | | |
|---|---|---|---|---|---|---|
| | | | Passive Subscribe | | Active Subscribe | |
| | | | Ranging Initiator | Ranging Responder | Ranging Initiator | Ranging Responder |
| Publisher | Unsolicited Publish | Ranging Initiator | Invalid | Allowed | Invalid | Not Allowed |
| | | Ranging Responder | Allowed | Invalid | Not Allowed | Invalid |
| | Solicited Publish | Ranging Initiator | Invalid | Not Allowed | Invalid | Allowed |
| | | Ranging Responder | Not Allowed | Invalid | Allowed | Invalid |

As shown in Table 1, a NR-DEV may be a ranging initiator or a ranging responder. Note that at a minimum, a NR-DEV will support the role of ranging responder. In addition, a NR-DEV may also support the role of ranging initiator. In other words, the minimum requirement for a device to be a NR-DEV is support of the role of ranging responder. Additionally, as shown in Table 1, either of a NR-DEV publisher or NR-DEV subscriber may assume a role of initiator. For example, an unsolicited publisher may only take the role of ranging initiator if a subscriber is a passive subscriber that can only take the role of the ranging responder. As another example, a solicited publisher may only take the role of ranging responder if a subscriber is an active subscriber that may only take the role of the ranging initiator. Note that if both subscriber and publisher are ranging initiator and ranging responder capable, the service subscriber may decide which ranging role it will assume (take).

NAN Ranging Scheduling

In some embodiments, NAN ranging may be based on the FTM protocol. Thus, a NAN device that intends to perform ranging may schedule a time (or times) and a channel (or channels) to perform FTM procedures. According to NAN scheduling, a NAN schedule of a NAN device is based on an updatedFA (updated further availability window) which may be determined by its currentFA (current further availability window) and preferredFA (preferred further availability window). Note that the currentFA may indicate a current further availability map and the preferredFA may indicate other further availability windows preferred by the NAN device in addition to the currentFA.

Additionally, the updatedFA may indicate an updated further availability map between peer NAN devices and may serve as the currentFA for future use. In some embodiments, the NAN schedule (indicated by the updatedFA) may be used to determine a ranging schedule. The ranging schedule may be used to derive corresponding FTM parameters such as number of bursts exponent, burst duration, minimum delta FTM, partial timer synchronization function (TSF) timer, ASAP (as soon as possible) parameter, FTMs per burst, FTM format and bandwidth, and burst period, among other FTM parameters. In some embodiments, the ranging role selected by the NR-DEV acting as a subscriber/publisher may depend on requirements of a specific service and may be negotiated prior to performing ranging measurements. The negotiation may be performed as part of SDF exchanges.

Figure 4:
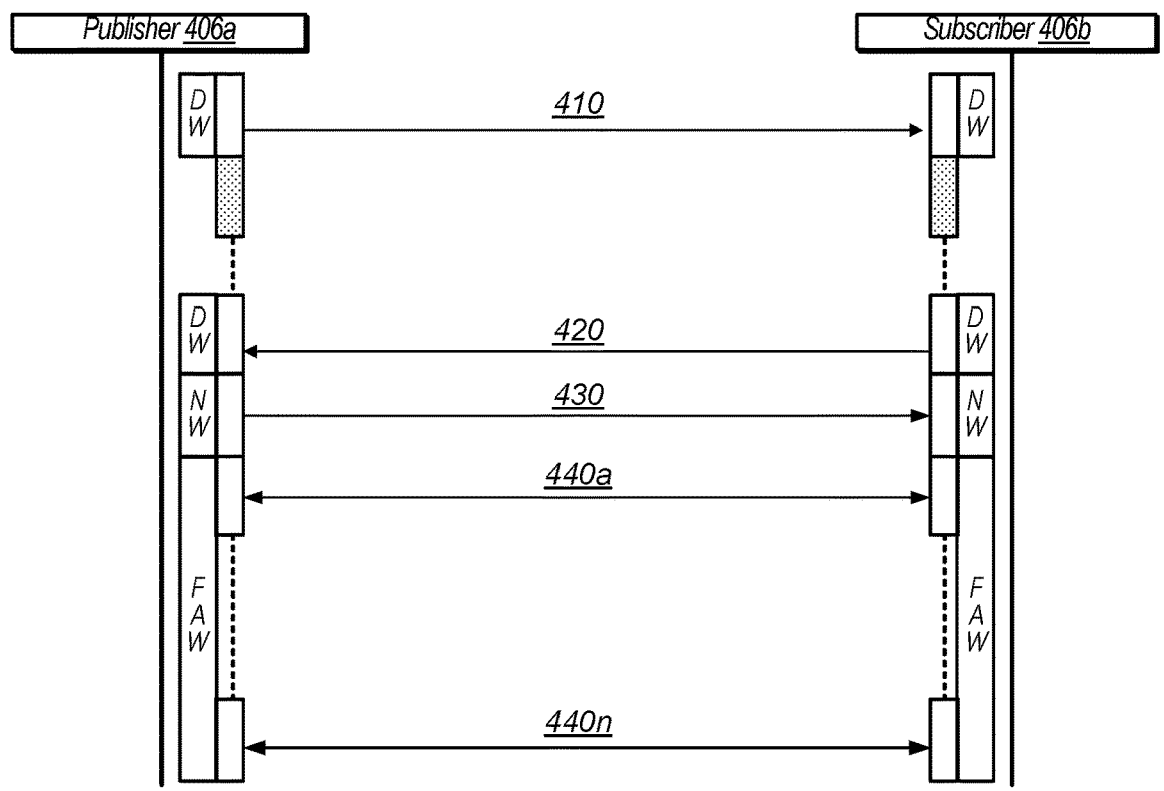
FIG. 4 illustrates an example signaling diagram between an unsolicited publishing NAN device and a passively subscribing NAN device, according to embodiments.
Figure 5:
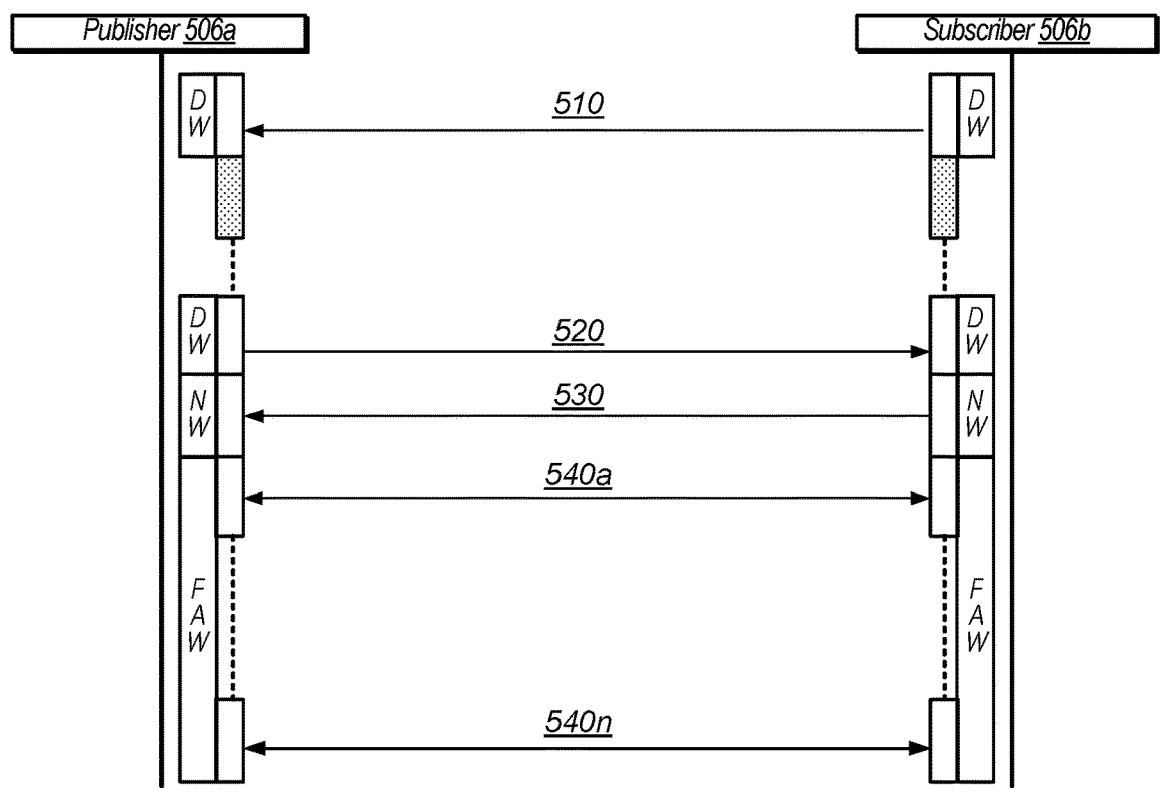
FIG. 5 illustrates an example signaling diagram between a solicited publishing NAN device and an actively subscribing NAN device, according to embodiments.

Exemplary signaling diagrams for various scenarios, e.g., as shown in Table 1 above, are illustrated in FIGS. 4 and 5.

In particular, FIG. 4 illustrates an exemplary signaling diagram between an unsolicited publishing NAN device and a passively subscribing NAN device. FIG. 5 illustrates an exemplary signaling diagram between a solicited publishing NAN device and an actively subscribing NAN device.

Note that embodiments illustrated in FIGS. 4 and 5 may be used in conjunction with any of the systems or devices shown in the above Figures, among other devices. In various embodiments, some of the signaling shown may be performed concurrently, in a different order than shown, or may be omitted. Additional signaling may also be performed as desired. The procedure (or method, technique) to schedule ranging between NAN devices may proceed as follows.

Turning to FIG. 4, at 410, a first NAN device, such as publisher 406a (e.g., a publishing NAN device or publisher), may send a first service discovery frame (SDF) to a second NAN device, such as subscriber 406b (e.g., to publish a service). Note that publisher 406a and subscriber 406b may include any or all of the features described above in reference to client station 106, among other features.

In some embodiments, the first SDF may include parameters such as a service description (SD), current availability (FA), preferred availability (preferredFA), and capabilities such as a ranging role (RR). In some embodiments, if the first NAN device has a ranging initiator role, the first SDF may also include an initial FTM request (or an FTM attribute carried in the first SDF) that includes the first NAN device's preferred FTM parameters. In some embodiments, the initial FTM request may include an as soon as possible (ASAP) parameter.

At 420, the second NAN device (e.g., subscriber 406b) may send a second SDF in response to the first SDF. The second SDF may include parameters such as a service description (SD), current availability (FA), preferred availability (preferredFA), and capabilities such as a ranging role (RR). In some embodiments, if the second NAN device has a ranging initiator role, the second SDF may also include an initial FTM request (or an FTM attribute carried in the second SDF) that includes the second NAN device's preferred FTM parameters. Alternatively, if the second NAN device has a ranging responder role, the second SDF may also include an initial FTM response (or an FTM attribute carried in the second SDF). In some embodiments, the initial FTM request may include an as soon as possible (ASAP) parameter.

At 430, the first NAN device may send a third SDF to confirm the updatedFA and/or an initial FTM response for NAN ranging if an initial FTM request or FTM attribute was sent in 420.

At 440, the initiator may initiate FTM procedures based on whether an initial FTM request was included in 420. Thus, if the initial FTM request was not included in 420, the FTM request may be negotiated using standard FTM procedures (e.g., an initial FTM request (+ack) and FTM_1 response (+ack) as part of 440). In some embodiments the ranging negotiation may occur in a first available time-slot based on the updatedFA negotiated in 430, as further described below. In such embodiments, the initiator/responder may honor the currentFA (e.g., the updatedFA in 430) in the ranging negotiation or the initiator/responder may send an SDF frame to update the currentFA (e.g., the updatedFA in 430) if the ranging negotiation results are different from the currentFA in terms of a need for higher bandwidth.

In some embodiments, the SDF may be sent after the ranging negotiation is completed in the current slot as well as in the next discovery window (DW). In some embodiments, if an initial FTM request was included at 420, the initial FTM request (+ack) and FTM_1 response (+ack) may be skipped in the FTM procedures. In other words, the initiator may start by sending an FTM trigger frame directly in the first available time-slot since the FTM has already been requested (FTM request) and acknowledged (FTM response).

Upon conclusion of the FTM procedure, the initiator may send a range value to the responder via SDF. The range value may be sent on a per time-slot basis or periodically (averaging over multiple measurements).

Turning to FIG. 5, at 510, a first NAN device, such as publisher 506*a* (e.g., a publishing NAN device or publisher), may receive a first SDF rom a second NAN device, such as subscriber 506B (e.g., to subscribe to a service). Note that publisher 506*a* and subscriber 506*b* may include any or all of the features described above in reference to client station 106, among other features.

In some embodiments, the first SDF may include parameters such as a service description (SD), current availability (FA), preferred availability (preferredFA), and capabilities such as a ranging role (RR). In some embodiments, if the second NAN device has a ranging initiator role, the first SDF may also include an initial FTM request (or an FTM attribute carried in the first SDF) that includes the second NAN device's preferred FTM parameters. In some embodiments, the initial FTM request may include an as soon as possible (ASAP) parameter.

At 520, the first NAN device may send a second SDF in response to the first SDF. The second SDF may include parameters such as a service description (SD), current availability (FA), preferred availability (preferredFA), and capabilities such as a ranging role (RR). In some embodiments, if the first NAN device has a ranging initiator role, the second SDF may also include an initial FTM request (or an FTM attribute carried in the second SDF) that includes the first NAN device's preferred FTM parameters. Alternatively, if the first NAN device has a ranging responder role, the second SDF may also include an initial FTM response (or an FTM attribute carried in the second SDF). In some embodiments, the initial FTM request may include an as soon as possible (ASAP) parameter.

At 530, the second NAN device may send a third SDF to confirm the updatedFA and/or an initial FTM response for NAN ranging if an initial FTM request or FTM attribute was sent in 520.

At 540, the initiator may initiate FTM procedures based on whether an initial FTM request was included in 520. Thus, if the initial FTM request was not included in 520, the FTM request may be negotiated using standard FTM procedures (e.g., an initial FTM request (+ack) and FTM_1 response (+ack) as part of 540). In some embodiments the ranging negotiation may occur in a first available time-slot based on the updatedFA negotiated in 530, as further described below. In such embodiments, the initiator/responder may honor the currentFA (e.g., the updatedFA in 530) in the ranging negotiation or the initiator/responder may send an SDF frame to update the currentFA (e.g., the updatedFA in 530) if the ranging negotiation results are different from the currentFA in terms of a need for higher bandwidth. In some embodiments, the SDF may be sent after the ranging negotiation is completed in the current slot as well as in the next discovery window (DW). In some embodiments, if an initial FTM request was included at 520, the initial FTM request (+ack) and FTM_1 response (+ack) may be skipped in the FTM procedures. In other words, the initiator may start by sending an FTM trigger frame directly in the first available time-slot since the FTM has already been requested (FTM request) and acknowledged (FTM response).

Upon conclusion of the FTM procedure, the initiator may send a range value to the responder via SDF. The range value may be sent on a per time-slot basis or periodically (averaging over multiple measurements).

Figure 6A:
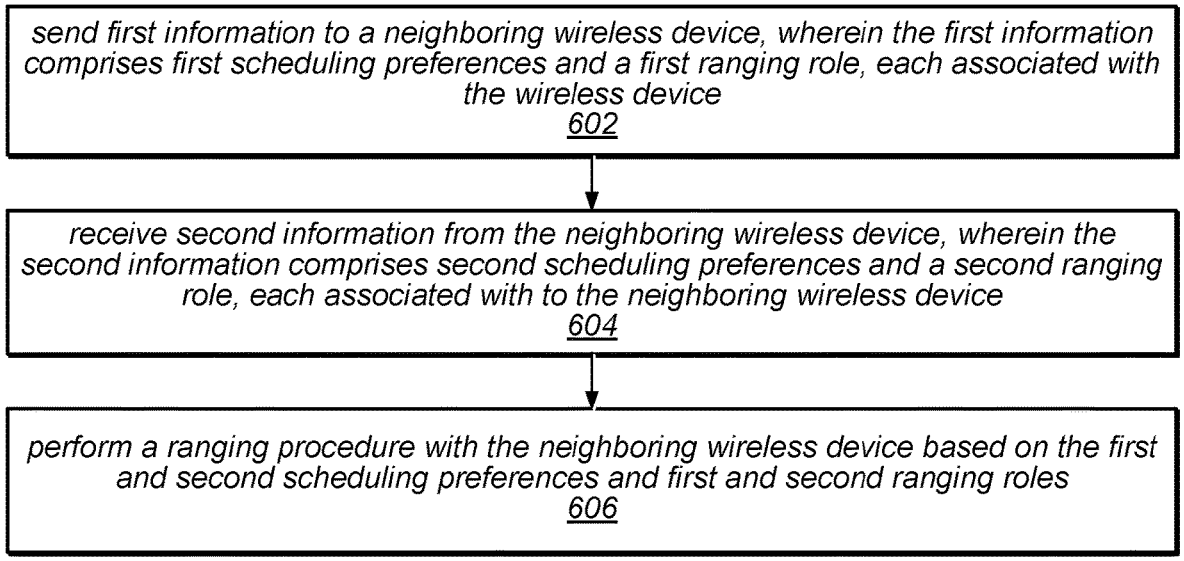
FIG. 6A illustrates an example block diagram of a method for scheduling a ranging procedure between peer devices, according to some embodiments.

FIG. 6A illustrates a block diagram of a method for scheduling a ranging procedure between peer devices, according to some embodiments. The method shown in FIG. 6A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a wireless device may send first information to a neighboring wireless device. The first information may include scheduling preferences of the wireless device. In addition, the first information may include a ranging role associated with the wireless device. In some embodiments, the scheduling preferences may include parameters such as current availability and/or preferred availability of the wireless device. In addition, the wireless device may specify ranging capability via the ranging role. In other words, the ranging role may indicate (or specify) whether the wireless device may operate as a ranging initiator and responder, or as a ranging responder only. In some embodiments, if the ranging role indicates the wireless device may be an initiator, the neighboring wireless device may determine that the wireless device may also be a responder. However, if the ranging role indicates that the wireless device may be a responder, the neighboring wireless device may determine that the wireless device may not be an initiator. In some embodiments, the first information may also include a service description (SD).

At 604, the wireless device may receive second information from the neighboring wireless device. The second information may include scheduling preferences of the neighboring wireless device. In addition, the second information may include a ranging role associated with the neighboring wireless device. In some embodiments, the scheduling preferences may include parameters such as current availability and/or preferred availability of the neighboring wireless device. In addition, the neighboring wireless device may specify its ranging capability via the ranging role. In other words, the ranging role may indicate (or specify) whether the neighboring wireless device may operate as a ranging initiator and a respond, or as a ranging responder only. In some embodiments, if the ranging role indicates the neighboring wireless device may be an initiator, the wireless device may determine that the neighboring wireless device may also be a responder. However, if the ranging role indicates that the neighboring wireless device may be a responder, the wireless device may determine that the neighboring wireless device may not be an initiator. In some embodiments, the second information may also include a service description (SD).

At 606, the wireless device may perform a ranging procedure with the neighboring wireless device. The ranging procedure may be based on the ranging roles and scheduling preferences exchanged between the wireless devices. In some embodiments, the wireless device may initiate the ranging procedure, e.g., if the wireless device has ranging capabilities including initiator and/or responder roles and the wireless device determines a role as initiator. In some embodiments, the neighboring wireless device may initiate the ranging procedure, e.g., if the wireless device does not have ranging capabilities including initiator role and/or if the neighboring wireless device has ranging capabilities including initiator and/or responder and determines a role as initiator.

Figure 6B:
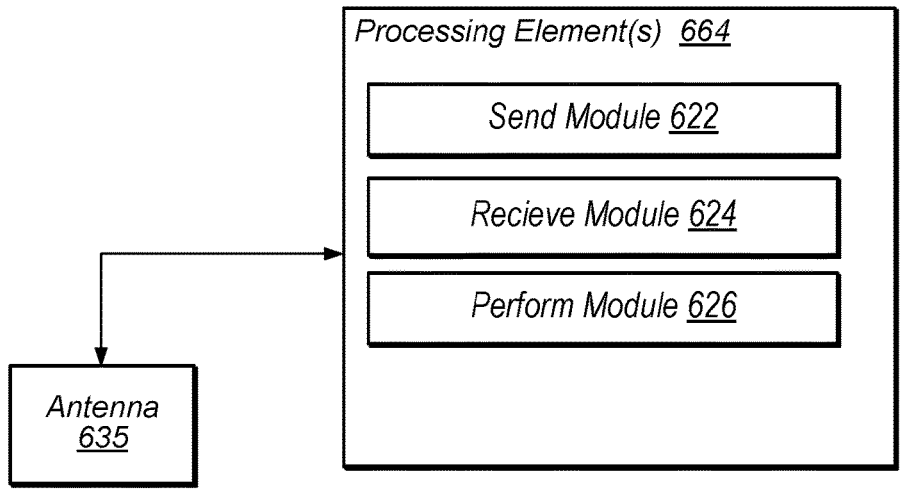
FIG. 6B illustrates an example processing element including modules for scheduling a ranging procedure between peer devices, according to some embodiments.

FIG. 6B illustrates a processing element including modules for scheduling a ranging procedure between peer devices, according to some embodiments. In some embodiments, antenna 635 may be coupled to processing element 664. The processing element may be configured to perform the method described above in reference to FIG. 6A. In some embodiments, processing element 664 may include one or more modules, such as modules (or circuitry) 622-626, and the modules (or circuitry) may be configured to perform various operations of the method described above in reference to FIG. 6A. In some embodiments, the processing element may be included in a device such as client station 106. In other embodiments, the processing element may be included in a baseband processor or radio of a device such as client station 106. As shown, the modules may be configured as follows.

In some embodiments, processing element 664 may include a send module 622 configured to send first information to a neighboring wireless device. The first information may include scheduling preferences of the wireless device. In addition, the first information may include a ranging role associated with the wireless device. In some embodiments, the scheduling preferences may include parameters such as current availability, preferred availability of the wireless device. In addition, the wireless device may specify ranging capability via the ranging role. In other words, the ranging role may indicate (or specify) whether the wireless device may be a ranging initiator and respond or a ranging responder only. In some embodiments, if the ranging role indicates the wireless device may be an initiator, the neighboring wireless may determine that the wireless device may also be a responder. However, if the ranging role indicates that the wireless device may be a responder, the neighboring wireless device may determine that the wireless device may not be an initiator. In some embodiments, the first information may also include a service description (SD).

In some embodiments, processing element 664 may include a receive module 624 configured to receive second information from the neighboring wireless device. The second information may include scheduling preferences of the neighboring wireless device. In addition, the second information may include a ranging role associated with the neighboring wireless device. In some embodiments, the scheduling preferences may include parameters such as current availability, preferred availability of the neighboring wireless device. In addition, the neighboring wireless device may specify ranging capability via the ranging role. In other words, the ranging role may indicate (or specify) whether the neighboring wireless device may be a ranging initiator and respond or a ranging responder only. In some embodiments, if the ranging role indicates the neighboring wireless device may be an initiator, the wireless may determine that the neighboring wireless device may also be a responder. However, if the ranging role indicates that the neighboring wireless device may be a responder, the wireless device may determine that the neighboring wireless device may not be an initiator. In some embodiments, the second information may also include a service description (SD).

In some embodiments, processing element 664 may include a perform module 626 configured to perform a ranging procedure with the neighboring wireless device. The ranging procedure may be based on the ranging roles and scheduling preferences exchanged between the wireless devices. In some embodiments, the wireless device may initiate the ranging procedure, e.g., if the wireless device has ranging capabilities including initiator and/or responder roles and the wireless device determines a role as initiator. In some embodiments, the neighboring wireless device may initiate the ranging procedure, e.g., if the wireless device does not have ranging capabilities including initiator role and/or if the neighboring wireless device has ranging capabilities including initiator and/or responder and determines a role as initiator.

It is apparent for those skilled in the art that, for the particular processes of the modules (or circuitry) described above (such as modules 622, 624, and 626) reference may be made to the corresponding operations (such as operations 602, 604, and 606, respectively) in the related process embodiment sharing the same concept and the reference is regarded as the disclosure of the related modules (or circuitry) as well. Furthermore, processing element 664 may be implemented in software, hardware or combination thereof. More specifically, processing element 664 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 664 may be implemented as a general-purpose processor such as a CPU, and therefore each module can be implemented with the CPU executing instructions stored in a memory which perform a respective operation.

NAN Ranging Setup

In some embodiments, a NAN ranging schedule may span multiple time-slots and each time-slot may be on a different channel with different bandwidth availabilities. Thus, a ranging operation can be scheduled as a full slot schedule (FSS) or a per slot schedule (PSS).

In FSS mode, time-slots used and associated FTM Parameters in the time-slots may be pre-specified for the entire ranging schedule by a responder. One benefit of FSS mode can be that there is no need for re-negotiation of the FTM parameters in each time-slot. In other words, one set of FTM Parameters may be used over the available time-slots (e.g. number of FTMs per burst, burst period, bandwidth, etc.). In some embodiments, this option may be limited to a time-slot with the most resource constraints. Alternatively, in some embodiments, a single set of FTM parameters per time-slot may be used to allow for more scheduling flexibility and to provide higher accuracy. However, such embodiments may require more overhead due to increased complexity.

In some embodiments, FSS may be used to track a NR-DEV by scheduling measurement bursts periodically. In some embodiments, there may be multiple RTT (round trip time) measurements within each burst.

In some embodiments, NAN devices (or applications) may set ranging to be performed at a pre-determined schedule without negotiation (e.g. every 512 TU with 2 RTT measurements) or ranging may be performed only at pre-defined communications windows, such as discovery windows, discovery window extensions (time window right after discovery windows), or paging windows (rendezvous windows for active NAN data paths).

Figure 7:
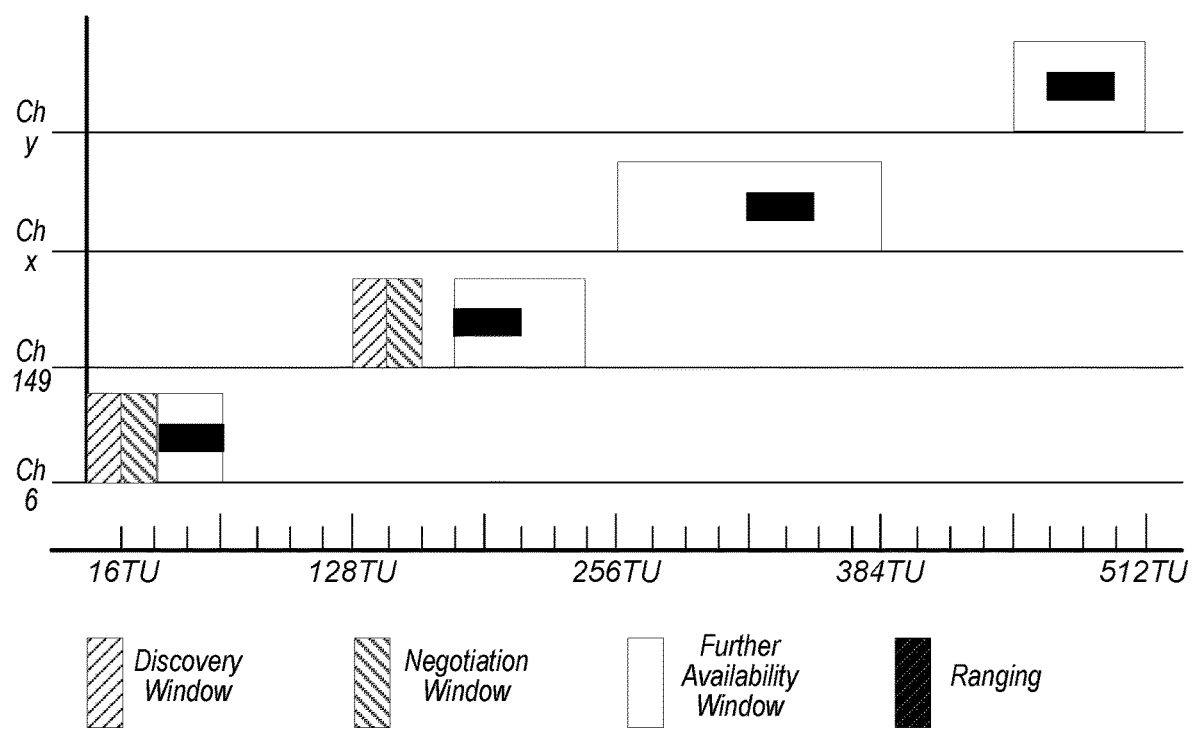
FIG. 7 illustrates an example frame schedule for full slot schedule (FSS) scheduling, according to some embodiments.

FIG. 7 illustrates a frame schedule for full slot schedule (FSS) scheduling, according to some embodiments. As illustrated, a frame may include a discovery window 730 on a 2.4 GHz channel (e.g., channel 6) and a discovery window 735 on a 5 GHz channel (e.g., channel 149). In addition, each discovery window may be followed by one or more negotiation windows (e.g., negotiation windows 740 and 745). Further, a further availability window may be scheduled on the 2.4 GHz channel (e.g., negotiation window 750) and the 5 GHz channel (e.g., negotiation window 755) as well as one or more additional channels (e.g., channels x and/or y and negotiation windows 757 and 759). A NAN ranging procedure as described above and further discussed below may be schedule during at least a portion of each further availability window (e.g., ranging procedures 760, 765, 767, and 769), as illustrated.

Figure 8B:
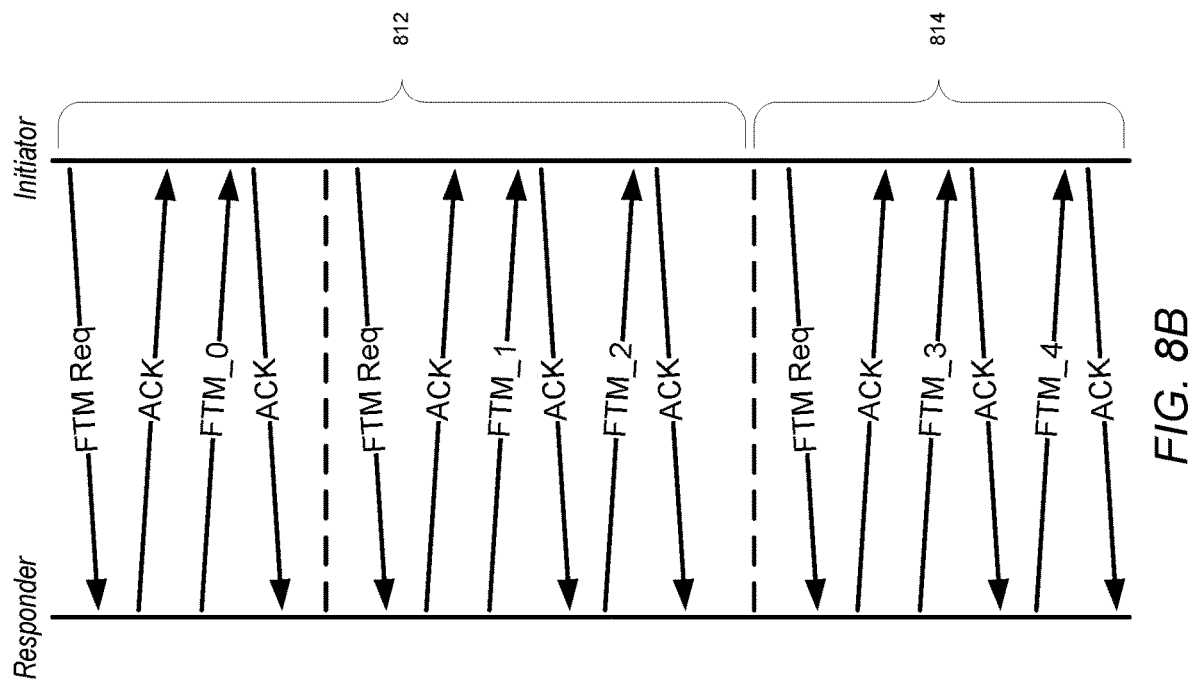
FIGS. 8A-8D illustrate example full slot schedule (FSS) signaling for various values of an as soon as possible (ASAP) parameter, according to some embodiments.
Figure 8A:
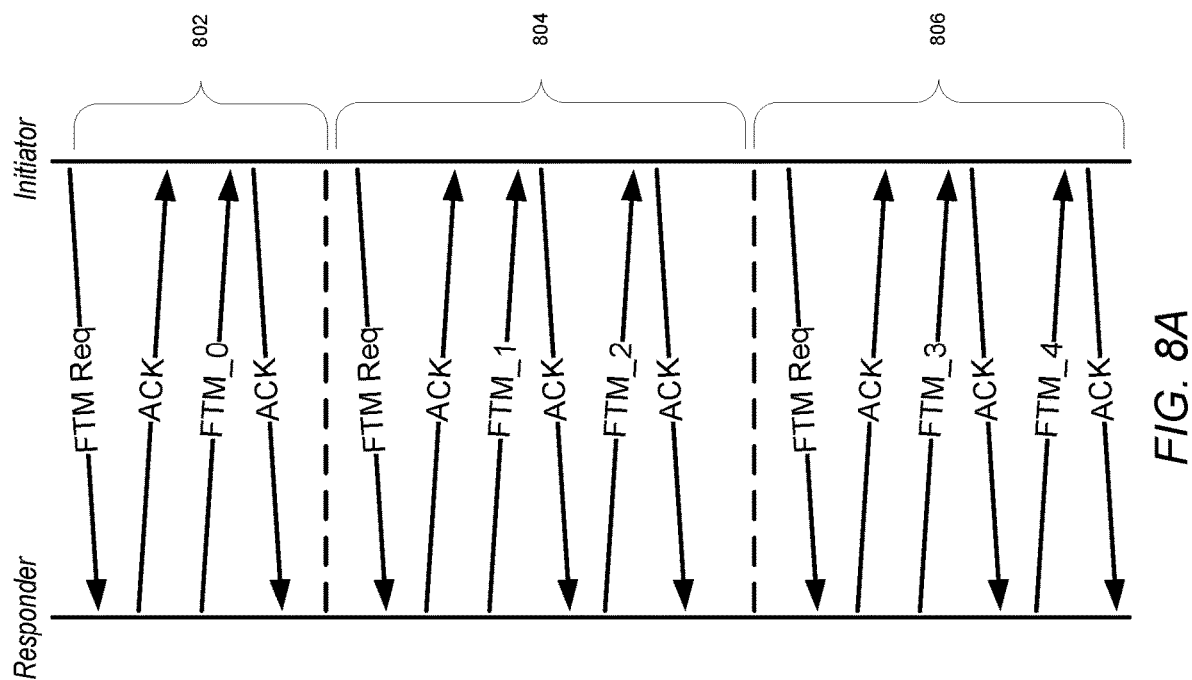
Figure 8D:
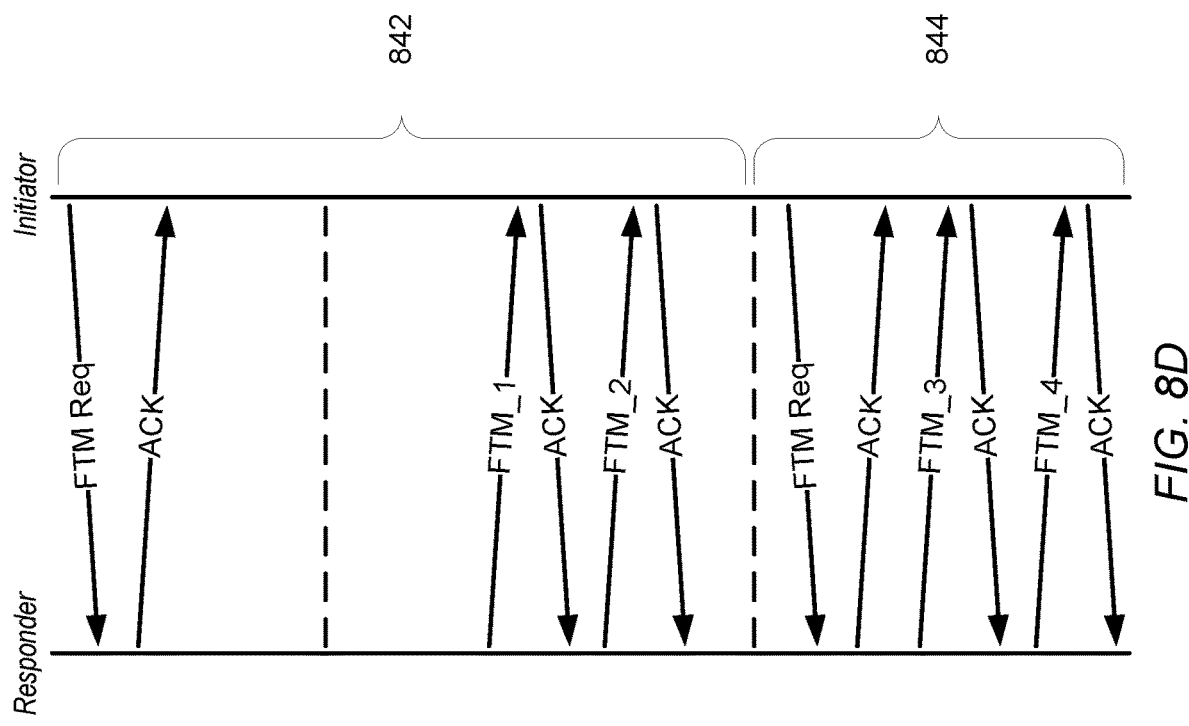
Figure 8C:
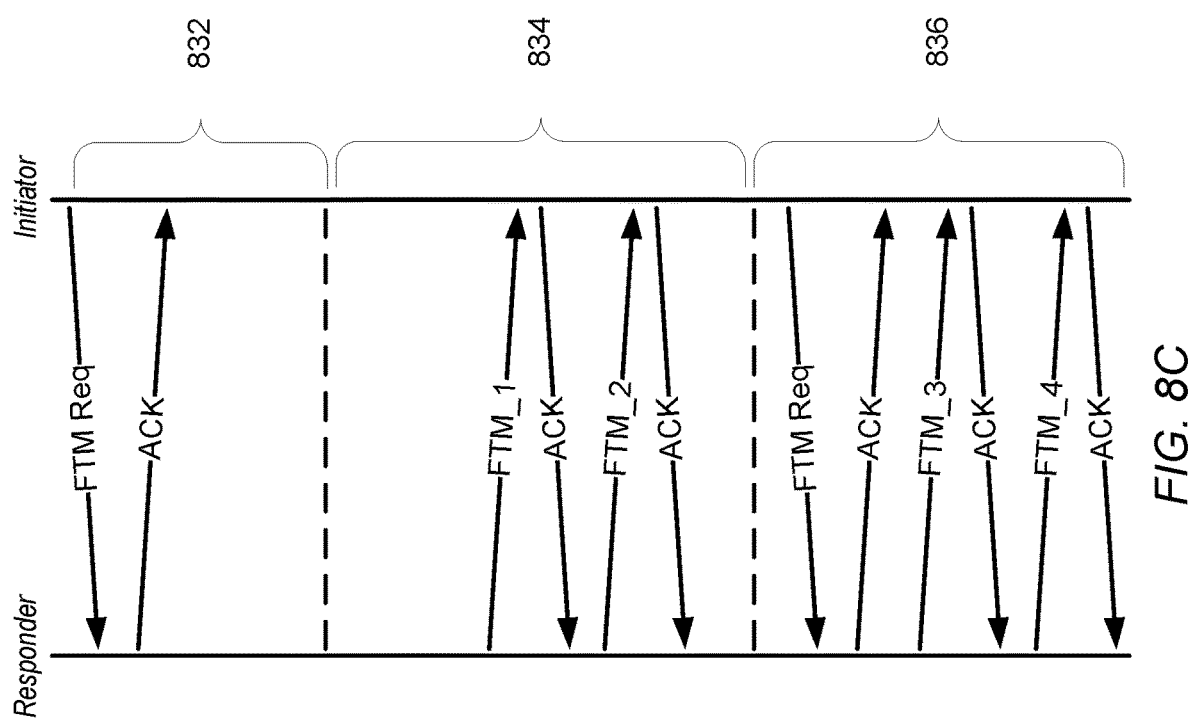

FIGS. 8A-8D illustrate full slot schedule (FSS) signaling for various values of an as soon as possible (ASAP) parameter, according to some embodiments. FIGS. 8A and 8B illustrate FSS scheduling and timing for an FSS with an initial FTM request including an as soon as possible (ASAP) parameter value of 0, according to some embodiments. FIGS. 8C and 8D illustrate FSS scheduling and timing for an FSS with an initial FTM request included in signaling step two for an ASAP parameter value of 1.

Turning to FIG. 8A, the signaling shown in FIG. 8A may be used in conjunction with any of the systems, methods, or devices shown in the above Figures, among other systems, devices, and methods. In various embodiments, some of the signaling shown may be performed concurrently, in a different order than shown, or may be omitted. Additional signaling may also be performed as desired. As shown, the signaling may operate as follows.

At 802, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send ranging parameters and/or a first response (FTM_0) and the initiator may acknowledge the response.

At 804, additional signaling may be exchanged between the initiator and responder to determine a first round trip time (RTT). Thus, the initiator may send an FTM request (FTM req) to the responder and may receive an acknowledgment from the responder. In addition, the responder may send a second and third response (FTM_1 and FTM_2) and the initiator may acknowledge the responses. In addition, the initiator may use timing parameters associated with the second and third responses (e.g., time sent, time received) to calculate the first RTT.

At 806, additional signaling may be exchanged between the initiator and responder to determine second and third RTTs. Thus, the initiator may send an FTM request (FTM req) to the responder and may receive an acknowledgment from the responder. In addition, the responder may send a fourth and fifth response (FTM_3 and FTM_4) and the initiator may acknowledge the responses. In addition, the initiator may use timing parameters associated with the third, fourth, and fifth responses (e.g., time sent, time received) to calculate the second and third RTTs.

Note additionally, that the signaling shown in FIG. 8A may be performed in conjunction with the signaling described in reference to FIGS. 4 and 5. For example, operations 802-806 may be included at 440a-n (or 540a-n). Alternatively, operation 802 may be included at 420 (or 520) and thus may not be required as part of 440a-n (or 540a-n) (e.g., if negotiation regarding the ranging occurs at 420 (or 520), then the negotiation of operation 802 may be skipped (or omitted) and the signaling may proceed with 804 and 806.

Turning to FIG. 8B, the signaling shown in FIG. 8B may be used in conjunction with any of the systems, methods, or devices shown in the above Figures, among other systems, devices, and methods. In various embodiments, some of the signaling shown may be performed concurrently, in a different order than shown, or may be omitted. Additional signaling may also be performed as desired. As shown, the signaling may operate as follows.

At 812, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send ranging parameters and/or a first response (FTM_0) and the initiator may acknowledge the response. Further, additional signaling may be exchanged between the initiator and responder to determine a first round trip time (RTT). Thus, the initiator may send another FTM request (FTM req) to the responder and may receive another acknowledgment from the responder. In addition, the responder may send a second and third response (FTM_1 and FTM_2) and the initiator may acknowledge the responses. In addition, the initiator may use timing parameters associated with the second and third responses (e.g., time sent, time received) to calculate the first RTT.

At 814, additional signaling may be exchanged between the initiator and responder to determine second and third RTTs. Thus, the initiator may send an FTM request (FTM req) to the responder and may receive an acknowledgment from the responder. In addition, the responder may send a fourth and fifth response (FTM_3 and FTM_4) and the initiator may acknowledge the responses. In addition, the initiator may use timing parameters associated with the third, fourth, and fifth responses (e.g., time sent, time received) to calculate the second and third RTTs.

Note additionally, that the signaling shown in FIG. 8B may be performed in conjunction with the signaling described in reference to FIGS. 4 and 5. For example, operations 812-814 may be included at 440a-n (or 540a-n).

Turning to FIG. 8C, the signaling shown in FIG. 8C may be used in conjunction with any of the systems, methods, or devices shown in the above Figures, among other systems, devices, and methods. In various embodiments, some of the signaling shown may be performed concurrently, in a different order than shown, or may be omitted. Additional signaling may also be performed as desired. As shown, the signaling may operate as follows.

At 832, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder.

At 834, additional signaling may be exchanged between the initiator and responder to determine a first round trip time (RTT). Thus, the responder may send a first and second response (FTM_1 and FTM_2) and the initiator may acknowledge the responses. In addition, the initiator may use timing parameters associated with the first and second responses (e.g., time sent, time received) to calculate the first RTT.

At 836, additional signaling may be exchanged between the initiator and responder to determine second and third RTTs. Thus, the initiator may send an FTM request (FTM req) to the responder and may receive an acknowledgment from the responder. In addition, the responder may send a third and fourth response (FTM_3 and FTM_4) and the initiator may acknowledge the responses. In addition, the initiator may use timing parameters associated with the second, third, and fourth responses (e.g., time sent, time received) to calculate the second and third RTTs.

Note additionally, that the signaling shown in FIG. 8C may be performed in conjunction with the signaling described in reference to FIGS. 4 and 5. For example, operations 832-836 may be included at 440a-n (or 540a-n). Alternatively, operation 832 may be included at 420 (or 520) and thus may not be required as part of 440a-n (or 540a-n) (e.g., if negotiation regarding the ranging occurs at 420 (or 520), then the negotiation of operation 832 may be skipped (or omitted) and the signaling may proceed with 834 and 836.

Turning to FIG. 8D, the signaling shown in FIG. 8D may be used in conjunction with any of the systems, methods, or devices shown in the above Figures, among other systems, devices, and methods. In various embodiments, some of the signaling shown may be performed concurrently, in a different order than shown, or may be omitted. Additional signaling may also be performed as desired. As shown, the signaling may operate as follows.

At 842, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send a first and second response (FTM_1 and FTM_2) and the initiator may acknowledge the responses. In addition, the initiator may use timing parameters associated with the first and second responses (e.g., time sent, time received) to calculate the first RTT.

At 844, additional signaling may be exchanged between the initiator and responder to determine second and third RTTs. Thus, the initiator may send an FTM request (FTM req) to the responder and may receive an acknowledgment from the responder. In addition, the responder may send a third and fourth response (FTM_3 and FTM_4) and the initiator may acknowledge the responses. In addition, the initiator may use timing parameters associated with the second, third, and fourth responses (e.g., time sent, time received) to calculate the second and third RTTs.

Note additionally, that the signaling shown in FIG. 8D may be performed in conjunction with the signaling described in reference to FIGS. 4 and 5. For example, operations 842-844 may be included at operations 440a-n (or 540a-n).

In PSS mode, the first available time-slot and its associated FTM Parameters for ranging may be specified by a responder based on the updatedFA map and FTM parameters for subsequent time-slots may be negotiated separately on a slot-by-slot basis. In some embodiments, the negotiation may be performed during a DW and/or NW using an SDF or in a specific time-slot using an initial FTM Request and initial FTM Response.

Figure 9:
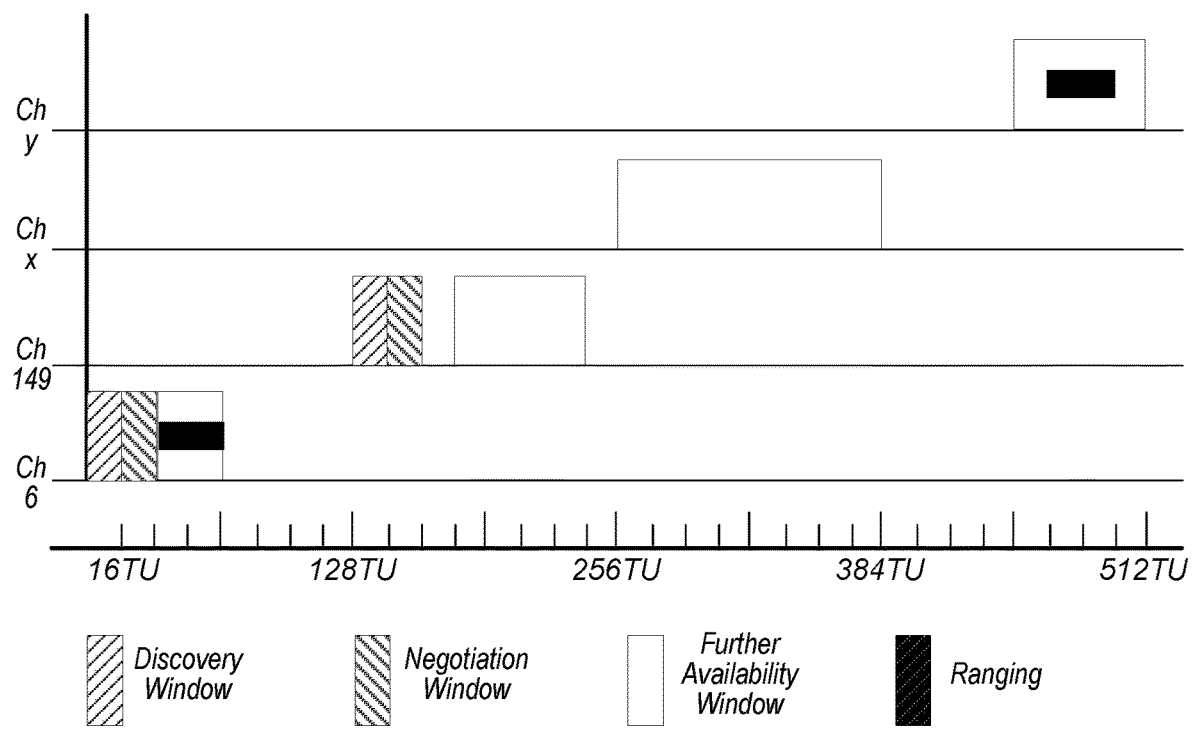
FIG. 9 illustrates an example frame schedule for partial slot schedule (PSS) scheduling, according to some embodiments.

FIG. 9 illustrates a frame schedule for partial slot schedule (PSS) scheduling, according to some embodiments. As illustrated, a frame may include a discovery window 930 on a 2.4 GHz channel (e.g., channel 6) and a discovery window 935 on a 5 GHz channel (e.g., channel 149). In addition, each discovery window may be followed by one or more negotiation windows (e.g., negotiation windows 940 and 945. Further, a further availability window may be schedule on the 2.4 GHz channel (e.g., negotiation window 950) and the 5 GHz channel (e.g., negotiation window 955) as well as one or more additional channels (e.g., channels x and y and negotiation windows 957 and 959). A NAN ranging procedure as described above and further discussed below may be schedule during at least a portion of the further availability window on the 2.4 GHz channel (e.g., ranging procedure 960) and at least one of the further availability windows on one of the one or more additional channels (e.g., channel x or y) (e.g., ranging procedure 969), as illustrated.

Figure 10B:
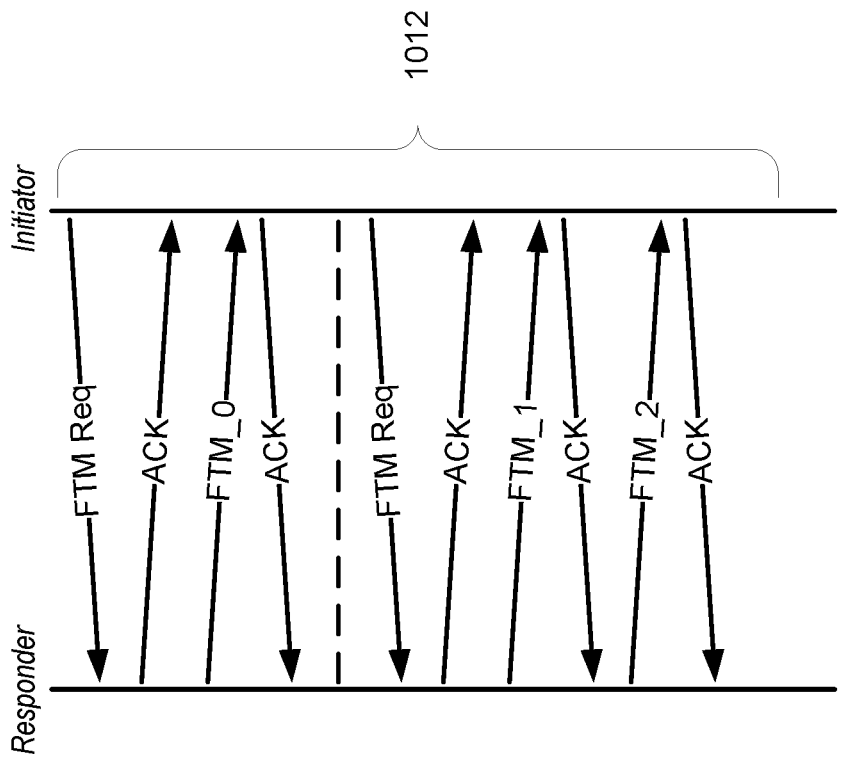
FIGS. 10A-10D illustrate example partial slot schedule (PSS) signaling for various values of an as soon as possible (ASAP) parameter, according to some embodiments.
Figure 10A:
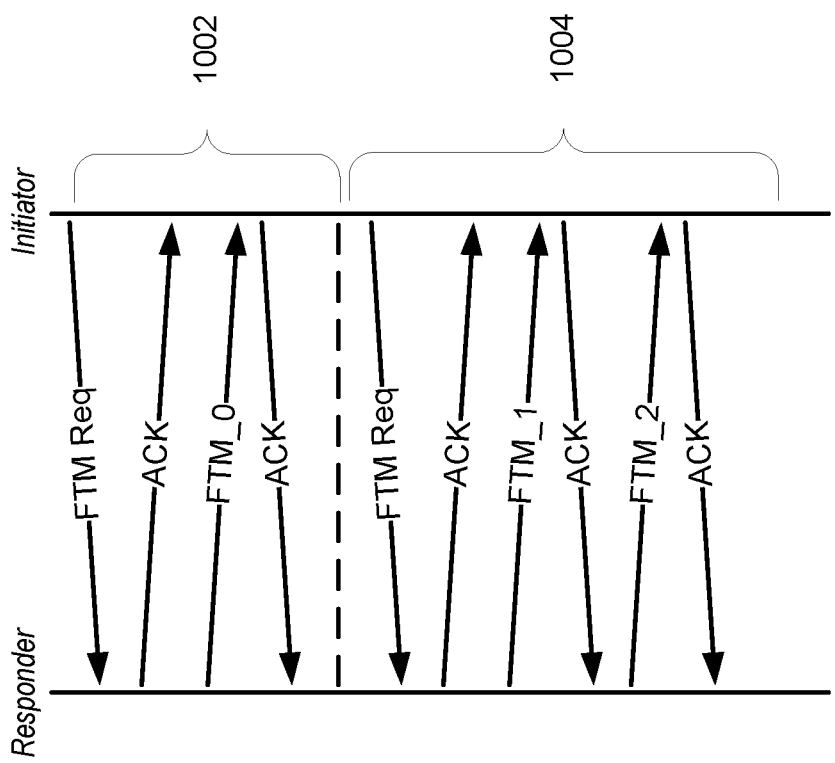
Figure 10D:
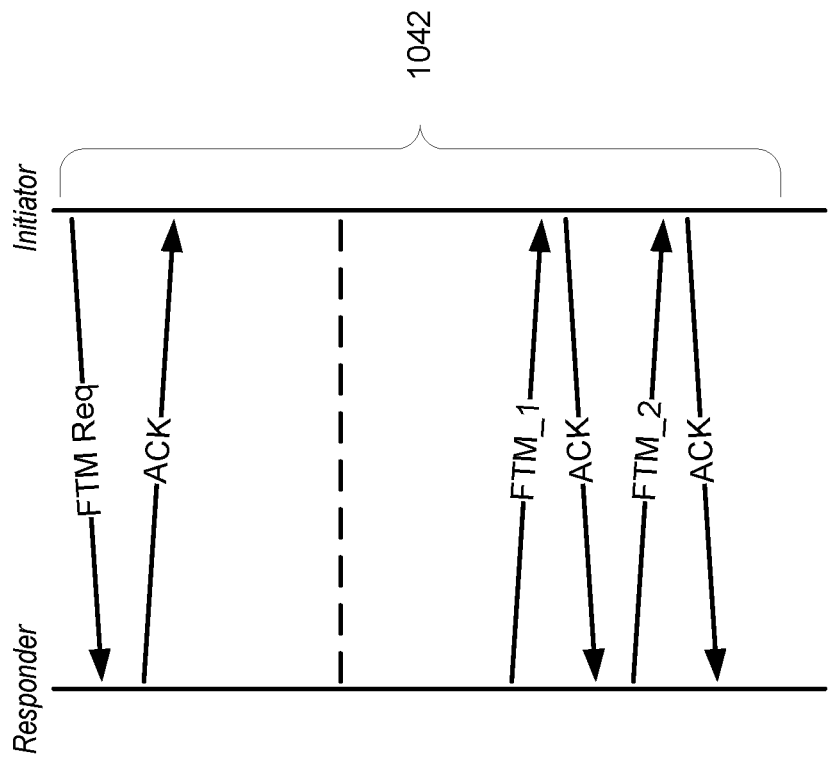
Figure 10C:
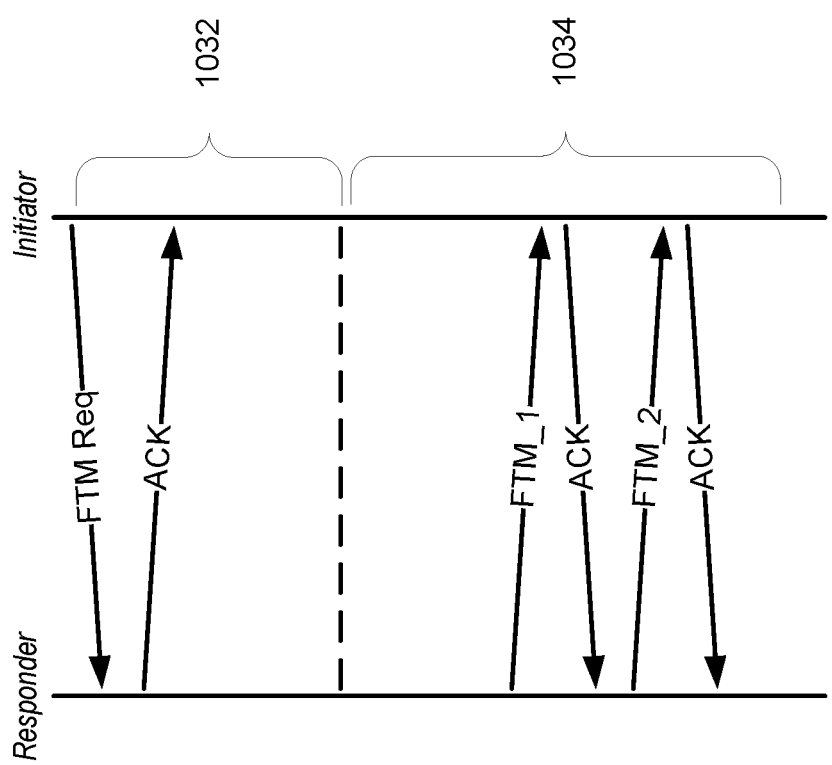

FIGS. 10A-10D illustrate partial slot schedule (PSS) signaling for various values of an as soon as possible (ASAP) parameter, according to some embodiments. FIGS. 10A and 10B illustrate PSS scheduling and timing for a PSS with FTM scheduling for ASAP parameter value of 0. FIGS. 10C and 10D illustrate PSS scheduling and timing for a PSS with FTM scheduling for ASAP parameter value of 1.

Turning to FIG. 10A, the signaling shown in FIG. 10A may be used in conjunction with any of the systems, methods, or devices shown in the above Figures, among other devices and methods. In various embodiments, some of the signaling shown may be performed concurrently, in a different order than shown, or may be omitted. Additional signaling may also be performed as desired. As shown, the signaling may operate as follows.

At 1002, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send ranging parameters and/or a first response (FTM_0) and the initiator may acknowledge the response.

At 1004, additional signaling may be exchanged between the initiator and responder to determine a round trip time (RTT). Thus, the initiator may send an FTM request (FTM req) to the responder and may receive an acknowledgment from the responder. In addition, the responder may send a second and third response (FTM_1 and FTM_2) and the initiator may acknowledge the responses. In addition, the initiator may use timing parameters associated with the second and third responses (e.g., time sent, time received) to calculate the RTT.

Note additionally, that the signaling shown in FIG. 10A may be performed in conjunction with the signaling described in reference to FIGS. 4 and 5. For example, operations 1002-1004 may be included at operations 440*a-n* (or 540*a-n*). Alternatively, 1002 may be included at operation 420 (Or 520) and thus may not be required as part of operations 440*a-n* (540*a-n*) (e.g., if negotiation regarding the ranging occurs at 420 (520), then the negotiation of 1002 may be skipped (or omitted) and the signaling may proceed with 1004.

Turning to FIG. 10B, the signaling shown in FIG. 10B may be used in conjunction with any of the systems, methods, or devices shown in the above Figures, among other devices and methods. In various embodiments, some of the signaling shown may be performed concurrently, in a different order than shown, or may be omitted. Additional signaling may also be performed as desired. As shown, the signaling may operate as follows.

At 1012, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send ranging parameters and/or a first response (FTM_0) and the initiator may acknowledge the response. Further, additional signaling may be exchanged between the initiator and responder to determine a round trip time (RTT). Thus, the initiator may send another FTM request (FTM req) to the responder and may receive another acknowledgment from the responder. In addition, the responder may send a second and third response (FTM_1 and FTM_2) and the initiator may acknowledge the responses. In addition, the initiator may use timing parameters associated with the second and third responses (e.g., time sent, time received) to calculate the RTT.

Note additionally, that the signaling shown in FIG. 10B may be performed in conjunction with the signaling described in reference to FIGS. 4 and 5. For example, 1012 may be included at operations 440*a-n* (or 540*a-n*).

Turning to FIG. 10C, the signaling shown in FIG. 10C may be used in conjunction with any of the systems, methods, or devices shown in the above Figures, among other devices and methods. In various embodiments, some of the signaling shown may be performed concurrently, in a different order than shown, or may be omitted. Additional signaling may also be performed as desired. As shown, the signaling may operate as follows.

At 1032, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder.

At 1034, additional signaling may be exchanged between the initiator and responder to determine a round trip time (RTT). Thus, the responder may send a first and second response (FTM_1 and FTM_2) and the initiator may acknowledge the responses. In addition, the initiator may use timing parameters associated with the first and second responses (e.g., time sent, time received) to calculate the RTT.

Note additionally, that the signaling shown in FIG. 10C may be performed in conjunction with the signaling described in reference to FIGS. 4 and 5. For example, operations 1032-1034 may be included at operations 440*a-n* (or 540*a-n*). Alternatively, 1032 may be included at 420 (or 520) and thus may not be required as part of operations 440*a-n* (540*a-n*) (e.g., if negotiation regarding the ranging occurs at 420 (520), then the negotiation of 1032 may be skipped (or omitted) and the signaling may proceed with 1034.

Turning to FIG. 10D, the signaling shown in FIG. 10D may be used in conjunction with any of the systems, methods, or devices shown in the above Figures, among other devices and methods. In various embodiments, some of the signaling shown may be performed concurrently, in a different order than shown, or may be omitted. Additional signaling may also be performed as desired. As shown, the signaling may operate as follows.

At 1042, signaling may be exchanged between initiator (e.g., a client station such as client station 106 described above) and responder (e.g., another client station, such as client station 106) to negotiate the parameters for the ranging. Thus, the initiator may send an FTM request (FTM req) to the responder and may receive an acknowledgment from the responder. In addition, the responder may send a first and second response (FTM_1 and FTM_2) and the initiator may acknowledge the responses. In addition, the initiator may use timing parameters associated with the first and second responses (e.g., time sent, time received) to calculate the RTT.

At 1044, additional signaling may be exchanged between the initiator and responder to determine second and third RTTs. Thus, the initiator may send an FTM request (FTM req) to the responder and may receive an acknowledgment from the responder. In addition, the responder may send a third and fourth response (FTM_3 and FTM_4) and the initiator may acknowledge the responses. In addition, the initiator may use timing parameters associated with the second, third, and fourth responses (e.g., time sent, time received) to calculate the second and third RTTs.

Note additionally, that the signaling shown in FIG. 10D may be performed in conjunction with the signaling described in reference to FIGS. 4 and 5. For example, operations 1042-1044 may be included at operations 440*a-n* (or 540*a-n*).

Ranging Termination

In some embodiments, ranging may be terminated at any time by the initiator or responder per FTM procedures. In some embodiments, ranging may also be terminated by sending an SDF frame in any time-slot with an updatedFA.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio communicatively coupled to the antenna and configured to perform Wi-Fi communication with a Wi-Fi access point;
   at least one processor communicatively coupled to the at least one radio, wherein the wireless device is configured to perform voice and/or data communications;
   wherein the at least one processor is configured to cause the wireless device to:
      transmit an indication of first ranging capabilities to a peer wireless device via one of a Neighbor Awareness Networking (NAN) discovery beacon, NAN synchronization beacon, or a service discovery frame (SDF), wherein the first ranging capabilities are indicated via a bit that indicates the wireless device is NAN ranging capable;
      receive, from the peer wireless device, second ranging capabilities indicating NAN ranging role compatibility between the wireless device and the peer wireless device; and
      initiate, based on the first and second ranging capabilities, a NAN ranging operation, wherein the NAN ranging operation is scheduled as one of a full slot schedule (FSS) NAN ranging operation, including a plurality of pre-specified time-slots and associated parameters, or a partial slot schedule (PSS) NAN ranging operation, including at least one pre-specified time-slot and associated one or more parameters.

2. The wireless device of claim 1,
   wherein the first ranging capabilities are further indicated via at least one of:
      a sub-set of ranging capabilities as defined in the Fine Timing Measurement (FTM) protocol; or
      a set of ranging capabilities as defined in the FTM protocol.

3. The wireless device of claim 1,
   wherein a schedule of the NAN ranging operation is based on one or more of an updated further availability window, current further availability window, or preferred further availability window of the wireless device.

4. The wireless device of claim 3,
   wherein Fine Timing Measurement (FTM) protocol parameters are derived from the schedule of the NAN ranging operation.

5. The wireless device of claim 4,
   wherein the FTM protocol parameters include one or more of a number of bursts exponent, a burst duration, a minimum delta FTM, a partial timer synchronization function (TSF) timer, an as soon as possible (ASAP) parameter, a number of FTMs per burst, FTM format, FTM bandwidth, or burst period.

6. The wireless device of claim 1,
   wherein when the NAN ranging operation is scheduled as FSS, the plurality of pre-specified time-slots and associated parameters are specified for the entire schedule of the NAN ranging operation by the peer wireless device.

7. The wireless device of claim 1,
   wherein when the NAN ranging operation is scheduled as PSS, the at least one pre-specified time-slot is and associated one or more parameters are specified by the peer wireless device, and wherein the associated parameters for ranging are based on an updated further availability window map.

8. The wireless device of claim 7,
   wherein parameters for subsequent time-slots are negotiated separately on a slot-by-slot basis by the wireless device and the peer wireless device.

9. An apparatus, comprising:
   a memory; and
   at least one processor in communication with the memory, wherein the at least one processor is configured to:
      generate instructions to cause transmission of an indication of first ranging capabilities to a peer wireless device via one of a Neighbor Awareness Networking (NAN) discovery beacon, NAN synchronization beacon, or a service discovery frame (SDF), wherein the first ranging capabilities are indicated via a bit that indicates the apparatus is NAN ranging capable;
      receive, from the peer wireless device, second ranging capabilities indicating NAN ranging role compatibility between the apparatus and the peer wireless device; and
      generate instructions to cause, based on the first and second ranging capabilities, an initiation of a NAN ranging operation, wherein the NAN ranging operation is scheduled as one of a full slot schedule (FSS) NAN ranging operation, including a plurality of pre-specified time-slots and associated parameters, or a partial slot schedule (PSS) NAN ranging operation, including at least one pre-specified time-slot and associated one or more parameters.

10. The apparatus of claim 9,
    wherein the first ranging capabilities are further indicated via at least one of:
       a sub-set of ranging capabilities as defined in the Fine Timing Measurement (FTM) protocol; or
       a set of ranging capabilities as defined in the FTM protocol.

11. The apparatus of claim 9,
    wherein a schedule of the NAN ranging operation is based on one or more of an updated further availability window, current further availability window, or preferred further availability window.

12. The apparatus of claim 9,
    wherein Fine Timing Measurement (FTM) protocol parameters are derived from the schedule of the NAN ranging operation.

13. The apparatus of claim 12,
    wherein the FTM protocol parameters include one or more of a number of bursts exponent, a burst duration, a minimum delta FTM, a partial timer synchronization function (TSF) timer, an as soon as possible (ASAP) parameter, a number of FTMs per burst, FTM format, FTM bandwidth, or burst period.

14. The apparatus of claim 9,
    wherein when the NAN ranging operation is scheduled as FSS, the plurality of pre-specified time-slots and associated parameters are specified for the entire schedule of the NAN ranging operation by the peer wireless device.

15. The apparatus of claim 14,
wherein when the NAN ranging operation is scheduled as PSS, the at least one pre-specified time-slot is and associated one or more parameters are specified by the peer wireless device, wherein the associated parameters for ranging are based on an updated further availability window map, and wherein parameters for subsequent time-slots are negotiated separately on a slot-by-slot basis with the peer wireless device.

16. A non-transitory computer readable memory medium storing program instructions executable by a processor of a wireless device to:
generate instructions to transmit an indication of first ranging capabilities to a peer wireless device via one of a Neighbor Awareness Networking (NAN) discovery beacon, NAN synchronization beacon, or a service discovery frame (SDF), wherein the first ranging capabilities are indicated via a bit that indicates the wireless device is NAN ranging capable;
receive, from the peer wireless device, second ranging capabilities indicating NAN ranging role compatibility between the wireless device and the peer wireless device; and
generate instructions to initiate, based on the first and second ranging capabilities, a NAN ranging operation, wherein the NAN ranging operation is scheduled as one of a full slot schedule (FSS) NAN ranging operation, including a plurality of pre-specified time-slots and associated parameters, or a partial slot schedule (PSS) NAN ranging operation, including at least one pre-specified time-slot and associated one or more parameters.

17. The non-transitory computer readable memory medium of claim 16,
wherein the first ranging capabilities are further indicated via at least one of:
a sub-set of ranging capabilities as defined in the Fine Timing Measurement (FTM) protocol; or
a set of ranging capabilities as defined in the FTM protocol.

18. The non-transitory computer readable memory medium of claim 16,
wherein a schedule of the NAN ranging operation is based on one or more of an updated further availability window, current further availability window, or preferred further availability window of the wireless device, wherein Fine Timing Measurement (FTM) protocol parameters are derived from the schedule of the NAN ranging operation, and wherein the FTM protocol parameters include one or more of a number of bursts exponent, a burst duration, a minimum delta FTM, a partial timer synchronization function (TSF) timer, an as soon as possible (ASAP) parameter, a number of FTMs per burst, FTM format, FTM bandwidth, or burst period.

19. The non-transitory computer readable memory medium of claim 16,
wherein when the NAN ranging operation is scheduled as FSS, the plurality of pre-specified time-slots and associated parameters are specified for the entire schedule of the NAN ranging operation by the peer wireless device.

20. The non-transitory computer readable memory medium of claim 16,
wherein when the NAN ranging operation is scheduled as PSS, the at least one pre-specified time-slot is and associated one or more parameters are specified by the peer wireless device, wherein the associated parameters for ranging are based on an updated further availability window map, and wherein parameters for subsequent time-slots are negotiated separately on a slot-by-slot basis with the peer wireless device.

* * * * *